US012312835B2

(12) United States Patent
Bodechon et al.

(10) Patent No.: US 12,312,835 B2
(45) Date of Patent: May 27, 2025

(54) SELF-ADJUSTING LOCKING PIECE FOR A LOCKING UNIT

(71) Applicant: Sphinx Electronics GmbH &Co KG, Kenzingen (DE)

(72) Inventors: Pascal Bodechon, Ettenheim (DE); Sebastian Stumpp, Winden (DE)

(73) Assignee: Sphinx Electronics GmbH &Co KG, Kenzingen (DE)

( * ) Notice: Subject to any disclaimer, the term of this patent is extended or adjusted under 35 U.S.C. 154(b) by 367 days.

(21) Appl. No.: 17/302,427

(22) Filed: May 3, 2021

(65) Prior Publication Data

US 2021/0254367 A1 Aug. 19, 2021

Related U.S. Application Data

(63) Continuation of application No. PCT/EP2019/078980, filed on Oct. 24, 2019.

(30) Foreign Application Priority Data

Dec. 4, 2018 (DE) ..................... 20 2018 106 887.3

(51) Int. Cl.

| | |
|---|---|
| ***E05B 15/02*** | (2006.01) |
| ***E05B 47/00*** | (2006.01) |
| *E05B 63/00* | (2006.01) |

(52) U.S. Cl.

CPC ........ *E05B 15/024* (2013.01); *E05B 47/0038* (2013.01); *E05B 2015/027* (2013.01); *E05B 2063/0026* (2013.01)

(58) Field of Classification Search

CPC .... E05B 15/024; E05B 15/02; E05B 15/0205; E05B 15/022; E05B 15/0245;

(Continued)

(56) References Cited

U.S. PATENT DOCUMENTS 4,989,313 A * 2/1991 Dzurko .................. E05B 17/06 33/DIG. 1
5,997,056 A 12/1999 Yamagishi (Continued)

FOREIGN PATENT DOCUMENTS

CN 102844511 A 12/2012
DE 20 2008 004 173 U1 8/2009

(Continued)

*Primary Examiner* — Kristina R Fulton
*Assistant Examiner* — Noah Horowitz
(74) *Attorney, Agent, or Firm* — Orbit IP, LLP; Marc G. Martino

(57) ABSTRACT

A locking piece for a locking unit includes a housing having a housing opening. A locking arm, which engages through the housing opening, is mounted so as to be displaceable, in a direction at a right angle to its longitudinal direction, in the housing opening. A slide is guided displaceably in the housing in the displacement direction of the locking arm and is motion-coupled to the locking arm in the displacement direction. The housing and/or the slide are/is formed from magnetically attractable material. At least one magnet acts between the housing and slide and positionally fixes the locking arm in each possible displacement position within the housing opening.

29 Claims, 2 Drawing Sheets

(58) Field of Classification Search
CPC ....... E05B 2015/027; E05B 2015/0275; E05B 2015/0295; E05B 47/0038; E05B 47/0046; E05B 2063/0026; E05B 63/0056; E05B 15/0073; E05B 85/04; E05B 85/045
See application file for complete search history.

(56) References Cited

U.S. PATENT DOCUMENTS

| | | | | |
|---|---|---|---|---|
| 7,029,043 | B2 * | 4/2006 | Fisher | E05B 15/0006<br>292/DIG. 40 |
| 8,047,582 | B1 | 11/2011 | Rodgers et al. | |
| 8,905,443 | B2 | 12/2014 | Alber | |
| 8,959,966 | B2 | 2/2015 | Clark et al. | |
| 9,121,205 | B2 * | 9/2015 | Muramatsu | E05B 85/045 |
| 9,957,738 | B2 * | 5/2018 | Muramatsu | E05B 81/18 |
| 2008/0289380 | A1 | 11/2008 | Blattmann | |
| 2020/0115923 | A1 * | 4/2020 | DeYoung | E05B 17/22 |

FOREIGN PATENT DOCUMENTS

| | | | | | |
|---|---|---|---|---|---|
| DE | 102012013702 | A1 | * | 1/2014 | E05B 15/022 |
| DE | 102020124890 | A1 | * | 3/2022 | |
| EP | 2 740 867 | A2 | | 6/2014 | |
| FR | 3010116 | A1 | * | 3/2015 | E05B 15/0245 |
| FR | 3058703 | B1 | * | 11/2018 | E05B 15/0245 |
| WO | 2007-073582 | A1 | | 7/2007 | |
| WO | WO-2009096749 | A2 | * | 8/2009 | E05B 15/0295 |
| WO | 2014/127398 | A1 | | 8/2014 | |

* cited by examiner

SELF-ADJUSTING LOCKING PIECE FOR A LOCKING UNIT

CROSS-REFERENCE TO RELATED APPLICATIONS

This continuation application claims priority to PCT/EP2019/078980 filed on Oct. 24, 2019 which has published as WO 2020/114675 A1 and also the German application number 20 2018 106 887.3 filed on Dec. 4, 2018, the entire contents of which are fully incorporated herein with these references.

DESCRIPTION

Field of the Invention

The invention relates to a locking piece for a locking unit, comprising a housing having a housing opening, a locking arm which engages through the housing opening and is mounted so as to be displaceable, in a direction at a right angle to its longitudinal direction, in the housing opening, and a slide which is guided displaceably in the housing in the displacement direction of the locking arm and which is motion-coupled to the locking arm in the displacement direction. Furthermore, the invention also relates to a locking unit having such a locking piece.

Background of the Invention

Such a locking piece having a floating-mounted locking arm has been disclosed by DE 10 2012 013 702 A1, for example.

Swing doors and drawers are as a rule mounted in the furniture via respective hinges and guides. The swing doors, drawers of the furniture carcass and also the fittings themselves are subject to tolerances for installation-related reasons. Furthermore, the use and loading/actuation of the doors and drawers in the furniture over time means that a certain settling behavior cannot be ruled out. It is thus possible that the locking piece does not move sufficiently into the lock mouth or can be brought into the locking position only with difficulty, if at all. The locking piece is then no longer aligned with the lock mouth. It is therefore required to provide an adjustment capability, for example in the form of oblong holes, in the locking piece in order that the locking arm can always be (re) adjusted into the desired position relative to the lock mouth. Such adjusting operations are relatively laborious to carry out and time-consuming.

The locking piece known from the aforementioned DE 10 2012 013 702 A1 comprises a frame plate, which can be installed in a door leaf, and a bearing plate in which a door bow is received. The bearing plate is mounted in the frame plate in a floating manner in a plane perpendicular to the longitudinal direction of the door bow. The movement play of the floating-mounted bearing plate is braked by an elastic friction element which fixes the bearing plate in its displacement position without external action of force. In the locking position, the door bow is moved into, and locked in, the locking mouth of a lock. The floating mounting of the bearing plate ensures that the door bow connected to the bearing plate always assumes the optimal position in the lock mouth and also maintains this optimal position. However, the elastic friction element can lose gripping force in the course of time, for example as a result of aging, abrasion or some other wear.

Against this background, the object on which the invention is based is that of specifying a self-adjusting, position-holding locking piece for the locking of locks that is as wear-free as possible.

SUMMARY OF THE INVENTION

This object is achieved according to the invention, in the locking piece of the type stated at the outset, by virtue of the fact that the housing and/or the slide are/is formed from magnetically attractable material and that at least one magnet acts between the housing and slide and positionally fixes the locking arm in each possible displacement position within the housing opening.

According to the invention, the magnet exerts an attracting force on the housing and/or the slide such that friction forces act in each case between the magnet and the slide or housing. This causes a frictional engagement between the magnet and the slide or housing that holds or positionally fixes the locking arm in each possible displacement position within the housing opening. A stepless displacement of the slide and of the locking arm is possible by means of a friction engagement-overcoming action of force in the displacement direction on the locking arm and hence on the slide. Upon moving into the lock mouth, the locking arm thus adjusts itself with respect to the position of the lock mouth itself and, after moving out of the lock mouth, is held by the magnet in the adjusted position. The positional fixing of the slide occurs by means of the magnet in a wear-free manner. The magnets can additionally be used to actuate a reed contact (monitoring contact) on the lock mouth.

For the case that the housing and the slide are both formed from magnetically attractable material, the at least one magnet is particularly preferably arranged between the housing and slide, that is to say that the magnet adheres both on the housing and on the slide and thereby fixes the slide in its respective displacement position with respect to the housing. Alternatively or additionally, the at least one magnet can be fastened, in particular adhesively bonded, to the housing or to the slide.

The locking piece preferably has at least two magnets which, as viewed in the displacement direction, are arranged on both sides of the locking arm in order thereby to achieve a frictional engagement which is symmetrical with respect to the locking arm.

The free end of the locking arm that engages through the housing opening can advantageously take the form of a locking bow or locking eye.

In a preferred embodiment of the invention, the locking arm and the slide are plugged one into the other in a direction at a right angle to the displacement direction and are thus motion-coupled to one another in the displacement direction. Alternatively, however, the locking arm and the slide can also be formed in one piece.

The invention also relates to a—for example mechanical or electronic—locking unit with a lock, in particular a furniture lock, having a lock mouth, and with a locking piece as designed above, the locking arm of which is moved into, and locked in, the lock mouth in the locking position of the lock. According to the invention, the locking arm is steplessly displaced in the displacement direction in the lock mouth, against the friction forces produced by the magnet, into the respectively correct position, which then remains maintained by the magnet.

The lock mouth preferably has a run-in slope in order to facilitate the displacement of the locking arm upon insertion into the lock mouth.

Further advantages of the invention will emerge from the description, from the claims and from the drawing. Likewise, the features mentioned above and those still to be specified below can be used on their own in each case or multiply in any desired combinations. The embodiment as is shown and described is not to be understood as conclusive, but rather has an exemplary nature for the description of the invention.

DETAILED DESCRIPTION OF THE PREFERRED EMBODIMENTS

Figure 1:
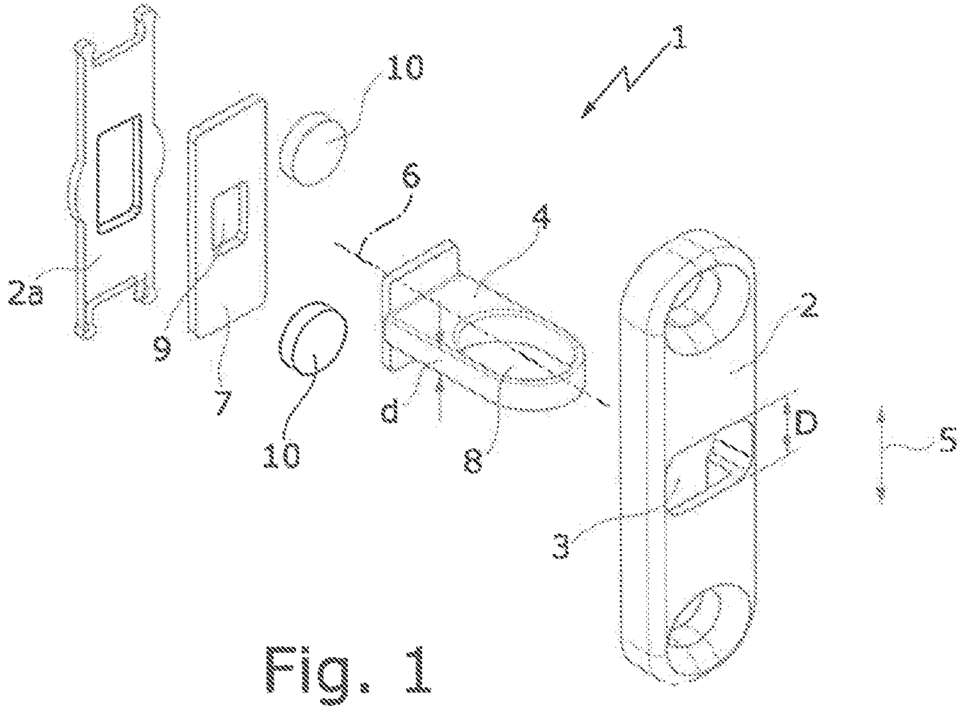
FIG. 1 shows an exploded illustration of the locking piece according to the invention having a vertically displaceable locking arm.

The locking piece 1 shown in FIG. 1 for a locking unit 20 (FIG. 2) comprises a housing 2 having a housing opening 3, a horizontal locking arm 4 which engages through the housing opening 3 and is mounted so as to be adjustable in height, in the vertical displacement direction 5, that is to say perpendicular to its longitudinal direction 6, in the housing opening 3, and a slide 7 which is displaceably guided in the housing 2 in the displacement direction 5 and is motion-coupled to the locking arm 4 in the displacement direction 5. The opening width D of the housing opening 3 in the displacement direction 5 is greater than the thickness d of the locking arm 4, as a result of which the locking arm 4 is displaceable within the housing opening 3 in the displacement direction 5. The housing 2, which is open on the rear side, is closed by a cover 2*a*.

The free end of the locking arm 4 that engages through the housing opening 3 has a locking eye 8 for locking in a lock. The other end of the locking arm 4 is plugged into an opening 9 in the slide 7, as a result of which the locking arm 4 is motion-coupled to the slide 7 in the displacement direction 5. Alternatively, the locking arm 4 and the slide 7 can also be formed in one piece.

Between the housing 2 and the slide 7, which are both formed from magnetically attractable material, there are arranged two magnets 10 which positionally fix the slide 7 and hence also the locking arm 4 in each possible displacement position within the housing opening 3. The two magnets 10 are, as viewed in the displacement direction 5, arranged on both sides of the locking arm 4 and adhere to the housing 2 at one end and to the slide 7 at the other end. The frictional engagement of the magnets 10 with the housing 2 and slide 7 means that the locking arm 4 remains held or positionally fixed in its respective displacement position within the housing opening 3. A stepless displacement of the slide 7 and of the locking arm 4 is possible by means of a frictional engagement-overcoming external action of force in the displacement direction 5 on the locking arm 4 and hence on the slide 7.

The housing 2 has, on both sides of the housing opening 3, a respective screw hole in order for the locking piece 1 to be able to be screwed onto a door, for example. Alternatively, however, the locking piece 1 can also be adhesively bonded to the door, and therefore the housing need not have any screw holes in this case.

Figure 2:
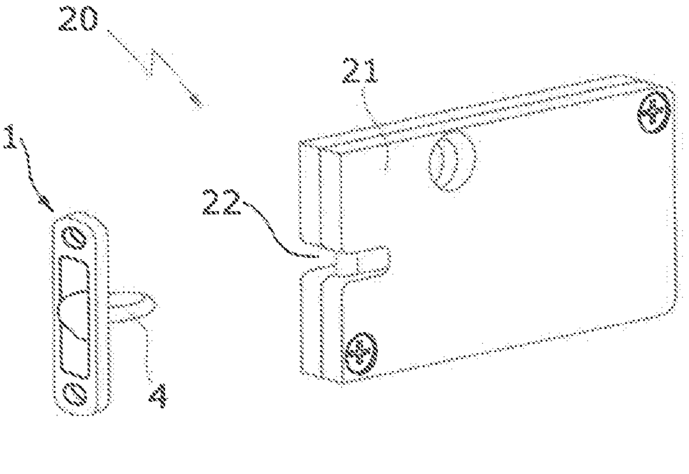
FIG. 2 shows a locking unit with a furniture lock and with the locking piece according to the invention.

The locking unit 20 shown in FIG. 2 consists of a mechanically or electrically actuable furniture lock 21 with a lock mouth 22 and with the locking piece 1 according to the invention, the locking arm 4 of which is moved into, and locked in, the lock mouth 22 in the locking position of the furniture lock 21. Upon moving into the lock mouth 22, the locking arm 4 thus automatically adjusts itself with respect to the vertical position thereof and, after moving out of the lock mouth 22, remains held by the magnet 10 in the adjusted position. The magnets 10 can additionally also be used in order to actuate a reed contact (monitoring contact) arranged on the lock mouth 22 when the locking arm 4 is moved into the lock mouth 22.

In FIG. 2, the locking arm 4 is moved from the end side into the lock mouth 22 of the furniture lock 21, that is to say in the longitudinal direction of the furniture lock 21, for example in the case of a sliding door. However, it is also possible for the locking piece 1 to be arranged to the side of the furniture lock 21 such that the locking arm 4 is moved from the side into the lock mouth 22, that is to say in the transverse direction of the furniture lock 21, for example in the case of a pivoting door.

Figures 3A, 3B, 3C:
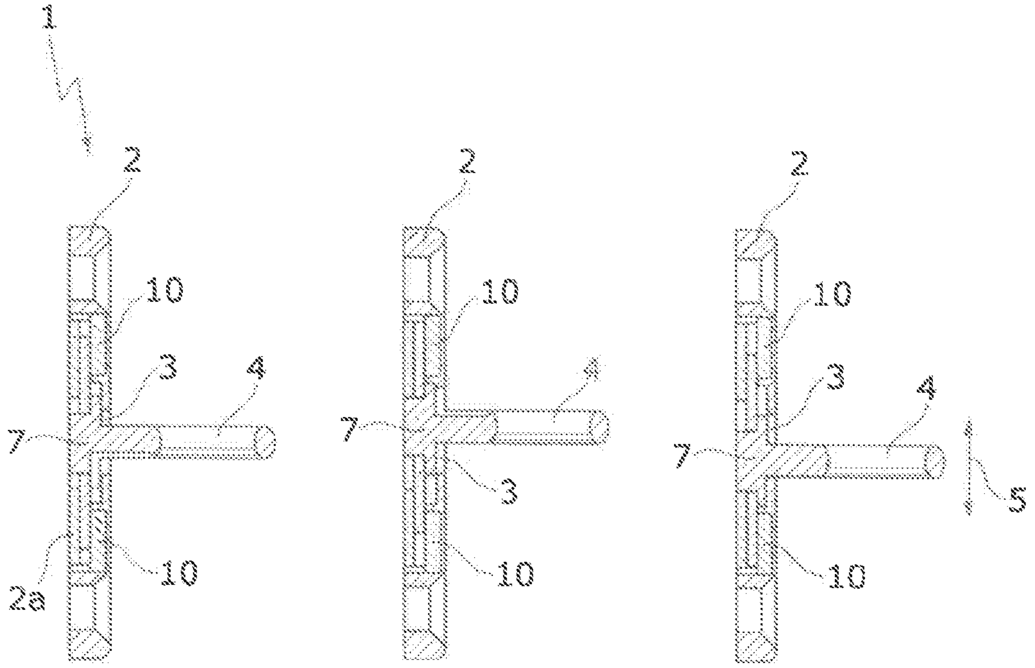
FIGS. 3*a*-3*c* show the locking piece according to the invention with the locking arm situated at different heights, in each case in longitudinal section.

The locking arm 4 is situated, in FIG. 3*a*, in its central displacement position in the housing opening 3, in FIG. 3*b* in its upper displacement end position in the housing opening 3, and in FIG. 3*c* in its lower displacement end position in the housing opening 3. In each possible displacement position, the locking arm 4 is held positionally fixed by means of the magnets 10.

What is claimed is:

1. A locking piece for a locking unit, comprising:
- a housing having a housing opening;
- a locking arm which engages through the housing opening and is mounted so as to be displaceable, in a direction at a right angle to its longitudinal direction, in the housing opening; and
- a slide which is guided displaceably in the housing in the displacement direction of the locking arm and which is motion-coupled to the locking arm in the displacement direction;
- wherein the housing and/or the slide are/is formed from magnetically attractable material, and wherein at least one magnet acts and is disposed between the housing and slide and positionally fixes the locking arm in each possible displacement position within the housing opening; and
- wherein the at least one magnet is arranged on a side face of the slide, wherein the side face of the slide faces the opening of the housing.

2. The locking piece as claimed in claim 1, wherein the housing and the slide are formed from magnetically attractable material, and the at least one magnet is arranged between the housing and the slide.

3. The locking piece as claimed in claim 2, wherein the at least one magnet is fastened or adhesively bonded, to the housing or to the slide.

4. The locking piece as claimed in claim 1, wherein the at least one magnet is fastened or adhesively bonded, to the housing or to the slide.

5. The locking piece as claimed in claim 1, wherein the locking piece has at least two magnets which, as viewed in the displacement direction, are arranged on both sides of the locking arm.

6. The locking piece as claimed in claim 1, wherein a free end of the locking arm that engages through the housing opening takes the form of a locking bow or locking eye.

7. The locking piece as claimed in claim 1, wherein the locking arm and the slide are plugged one into the other in a direction at a right angle to the displacement direction.

8. The locking piece as claimed in one of claim 1, wherein the locking arm and the slide are formed in one piece.

9. The locking unit with a lock having a lock mouth, and with the locking piece as claimed in claim 1, the locking arm of which is moved into, and locked in, the lock mouth in the locking position of the lock.

10. The locking piece as claimed in claim 1, wherein the at least one magnet is arranged between the housing and the slide, wherein the slide and the housing are in direct mechanical contact with the at least one magnet during displacement of the locking arm and after the housing is permanently attached to a furniture part, wherein the slide and the locking arm are configured to remain movable in the displacement direction of the locking arm after the housing is permanently attached to the furniture part.

11. The locking piece as claimed in claim 1, wherein the housing comprises a recess that is open on a rear side and is closed by a cover, wherein the slide, the at least one magnet and the cover are arranged within the recess.

12. The locking piece as claimed in claim 11, wherein the cover is configured not to prevent the displacement of the slide in the housing when the locking piece is permanently attached to a furniture part, and wherein the slide is arranged between the cover and the at least one magnet.

13. A locking piece for a locking unit, comprising:

a housing having a housing opening;

a locking arm which engages through the housing opening and is mounted so as to be displaceable, in a direction at a right angle to its longitudinal direction, in the housing opening; and a slide which is guided displaceably in the housing and restricted to movement in only the displacement direction of the locking arm and which is motion-coupled to the locking arm in the displacement direction;

wherein the housing and/or the slide are/is formed from magnetically attractable material, and wherein at least one magnet acts between the housing and the slide and positionally fixes the locking arm in each possible displacement position within the housing opening;

wherein the locking piece has at least two magnets which are disposed between the housing and the slide and, as viewed in the displacement direction, are arranged on both sides of the locking arm configured to achieve a frictional engagement symmetrical with respect to the locking arm.

14. The locking piece as claimed in claim 13, wherein the housing and the slide are formed from magnetically attractable material, and the two magnets are arranged between the housing and the slide.

15. The locking piece as claimed in claim 13, wherein the two magnets are fastened or adhesively bonded, to the housing or to the slide.

16. The locking piece as claimed in claim 13, wherein a free end of the locking arm that engages through the housing opening takes the form of a locking bow or locking eye.

17. The locking piece as claimed in claim 13, wherein the locking arm and the slide are plugged one into the other in a direction at a right angle to the displacement direction.

18. The locking piece as claimed in claim 13, wherein the locking arm and the slide are formed in one piece.

19. The locking unit with a lock having a lock mouth, and with the locking piece as claimed in claim 13, the locking arm of which is moved into, and locked in, the lock mouth in the locking position of the lock.

20. The locking unit as claimed in claim 19, wherein the lock mouth has a run-in slope for the locking arm.

21. The locking unit as claimed in claim 19, wherein a reed contact is arranged on the lock mouth.

22. The locking unit as claimed in claim 21, wherein at least one of the magnets of the locking piece actuates the reed contact when the locking arm is moved into the lock.

23. The locking unit as claimed in claim 19, wherein the locking arm is steplessly displaced in the displacement direction in the lock mouth upon closing the lock into a correct position, wherein the correct position is maintained by one of the magnets or the magnets.

24. The locking piece as claimed in claim 13, wherein the magnets are arranged on a side face of the slide, wherein the side face of the slide faces the opening of the housing.

25. The locking piece as claimed in claim 13, wherein the slide and the housing are in direct mechanical contact with the at least one magnet during displacement of the locking arm and after the housing is permanently attached to a furniture part.

26. The locking piece as claimed in claim 13, wherein the slide and the locking arm are configured to remain movable in the displacement direction of the locking arm after the housing is permanently attached to a furniture part.

27. A locking piece for a locking unit, comprising:

a housing having a housing opening;

a locking arm which engages through the housing opening and is mounted to be displaceable, in a direction at a right angle to its longitudinal direction, in the housing opening; and a slide which is guided displaceably in the housing and restricted to movement in only the displacement direction of the locking arm and which is motion-coupled to the locking arm in the displacement direction;

wherein the housing and/or the slide are/is formed from magnetically attractable material, and wherein at least one magnet acts between the housing and the slide and positionally fixes the locking arm in each possible displacement position within the housing opening; and wherein, when the housing of the locking piece is firmly fastened to a furniture part, the slide remains guided displaceably in the housing in the vertical displacement direction.

28. The locking piece as claimed in claim 27, wherein the locking piece has at least two magnets which are disposed between the housing and the slide and, as viewed in the displacement direction, are arranged on both sides of the locking arm configured to achieve a frictional engagement which is symmetrical with respect to the locking arm.

29. The locking piece as claimed in claim 27, wherein a free end of the locking arm that engages through the housing opening takes the form of a locking eye and wherein the locking eye is open in the displacement direction of the locking arm and, when the housing of the locking piece is firmly fastened to a furniture part, is open in the vertical direction.

* * * * *